United States Patent [19]

Berg

[11] Patent Number: 4,977,549

[45] Date of Patent: Dec. 11, 1990

[54] WRITE AND ERASE MAGNETIC BIAS FIELD SWITCHING SYSTEM FOR A MAGNETO-OPTIC DISK DRIVE

[75] Inventor: Thomas E. Berg, Colorado Springs, Colo.

[73] Assignee: Hewlett Packard Co., Palo Alto, Calif.

[21] Appl. No.: 246,776

[22] Filed: Sep. 20, 1988

[51] Int. Cl.⁵ ............... G11B 11/10; G11B 11/12; G11B 13/04

[52] U.S. Cl. ............................ 369/13; 360/114

[58] Field of Search ............ 369/13; 360/59, 114; 365/122

[56] References Cited

FOREIGN PATENT DOCUMENTS

| | | | |
|---|---|---|---|
| 59-92406 | 5/1984 | Japan | 369/13 |
| 60-214438 | 10/1985 | Japan | 360/114 |
| 61-96540 | 5/1986 | Japan | 360/114 |
| 61-239449 | 10/1986 | Japan | 360/114 |
| 61-278059 | 12/1986 | Japan | 360/114 |
| 62-78754 | 4/1987 | Japan | 360/114 |
| 63-32755 | 2/1988 | Japan | 360/114 |

Primary Examiner—Stuart S. Levy
Assistant Examiner—Hoa Nguyen

[57] ABSTRACT

A magneto-optic disk drive includes a magneto-optic disk and a rotary arm for positioning a focus/bias field switching assembly adjacent bit positions on the disk. A bias field switching assembly includes an annular permanent magnet mounted within a guide for movement between write and erase positions and an objective lens. The magnet has central and pole surfaces generally parallel to the disk. Coils on the guide are energized to drive the magnet between the write and erase positions. In its erase position the magnet impinges a first polarity erase magnetic field on the disk. In its write position the magnet impinges a second polarity write magnetic field upon the disk. The magnet is releasably latched in both its write and erase positions by ferro-magnetic elements mounted to the guide.

32 Claims, 4 Drawing Sheets

WRITE AND ERASE MAGNETIC BIAS FIELD SWITCHING SYSTEM FOR A MAGNETO-OPTIC DISK DRIVE

BACKGROUND OF THE INVENTION

1. Field of the Invention.

The present invention relates generally to magneto-optic data recording systems. In particular, the present invention is a method and apparatus for producing write and erase bias fields in a magneto-optic disk drive.

2. Description of the Prior Art.

Magneto-optic data recording technology combines the eraseability features of magnetic data storage systems with the high data storage capacity of optical systems. A 5.25 inch magneto-optic disk can hold up to 600M bytes of information, 1000 or more times the amount of information that a similarly sized magnetic floppy diskette can store. Magneto-optic disks are also transportable and can be transferred between drives. Since the reading, writing and erasing operations are performed with light beams rather than mechanical heads, they have long life, higher reliability, and are relatively immune to physical wear.

The principles of magneto-optic technology are well known. Information is digitally stored at bit positions on a magneto-optic disk. Typical bit positions have a diameter of 0.8 to 2.0 microns. The orientation of the magnetic field at each bit position can be switched between a digital one state in which its north pole is oriented upward, and a second digital zero state in which the magnetic field is reversed and the north pole oriented downward. The orientation of the magnetic field at each bit position is selected by subjecting the bit position to the magnetic field of the appropriate polarity, and heating the bit position of the disk. The magnetic orientation of the bit position is frozen when the disk cools and returns to room temperature.

The magnetic fields of all bit positions in an unwritten disk will generally be oriented north poles down to represent a digital zero. When writing information, the bit positions will be subjected to a write magnetic bias field and heated by a high intensity laser beam. The orientation of the magnetic fields at the written bit positions will then reverse to north poles up. Bit positions are erased by subjecting them to an erase bias field of the opposite polarity, and again heating the bit. The magnetic field orientation at the erased bit positions will then reverse and switch to north pole down.

Data is read from the optical disk using a low-power laser beam. Because of the magneto-optic phenomenon known as the Kerr effect, the polarization of a laser beam impinged upon the bit positions will be rotated as a function of the magnetic orientation of the bit. The polarization of laser beam portions reflected from bit positions on the optical disk is detected by opto-electronic detector circuitry. Signals from the detector circuitry are then processed to determine whether the bit position is representative of a digital one or zero.

A variety of different techniques are currently used to generate the write and erase magnetic bias fields. One technique makes use of an electromagnet positioned adjacent the disk. By reversing of the polarity of the current applied to the electromagnet, both write and erase fields of the required strength can be generated. Although it is relatively inexpensive, and the fields it produces can be quickly switched between the write and erase polarities, significant amounts of power are continuously dissipated by the electromagnet. The heat generated by this power dissipation can have detrimental effects on the disk and other components of the disk drive.

Another known technique makes use of a rotating permanent magnet. Since power is only required to rotate the magnet to its write and erase magnetic field positions, heat dissipation is not a problem. The magnet and rotating mechanism are, however, relatively bulky. As a result, they tend to interfere with tracking and focus servomechanisms, and increase the overall size of the drive. These mechanisms are also relatively expensive.

Yet another technique makes use of two separate permanent magnets, one for producing the write field and the other for producing the erase field. The magnets are mounted to a carriage which is translated or rotated to position the desired magnet adjacent the disk. Power is required only for switching. Although they can be made more compact than the rotating single permanent magnet mechanisms discussed above, they are still relatively bulky and tend to interfere with tracking and focus servos. The translating or rotating mechanism is also relatively slow and expensive.

It is evident that there is a continuing need for improved bias field switching mechanisms for magneto-optic disk drives. In particular, a compact bias field switching mechanism which dissipates little heat and can quickly switch between write and erase bias fields is needed. The system must of course be relatively inexpensive to be commercially viable.

SUMMARY OF THE INVENTION

The present invention is a method for writing data to and erasing data from bit positions on a magneto-optic recording medium. The method makes use of permanent magnet means having a pole surface and an imaginary axis extending from the pole surface. The magnet has a first polarity erase magnetic field on the axis at a first distance from the pole surface, and a second opposite polarity write magnetic field on the axis at a second distance from the pole surface. When erasing data from the bit positions, the magnet is positioned at an erase position with the axis aligned with the bit positions and the pole surface spaced from the recording medium by the first distance. When writing data to the bit positions, the magnet is positioned at a write position with the axis aligned with the bit positions and the pole surface spaced from the recording medium by the second distance.

In a preferred embodiment the magnet is a ring magnet having a central aperture. The magnet is movably mounted in a guide with its central aperture concentric with the optical axis of the objective lens. Coils wound around the guide generate magnetic fields which force the magnet between its write and erase positions when energized. Ferro-magnetic elements mounted in the guide releasably latch the magnet in its write and erase positions.

The present invention has considerable advantages over known methods for generating write and erase bias fields. It is compact and relatively inexpensive. The bias field state is easily controlled and quickly switched by current pulses. Since no continuous current flow is needed to maintain the write or erase bias fields, it dissipates relatively small amounts of heat.

DETAILED DESCRIPTION OF THE PREFERRED EMBODIMENTS

Figure 1:
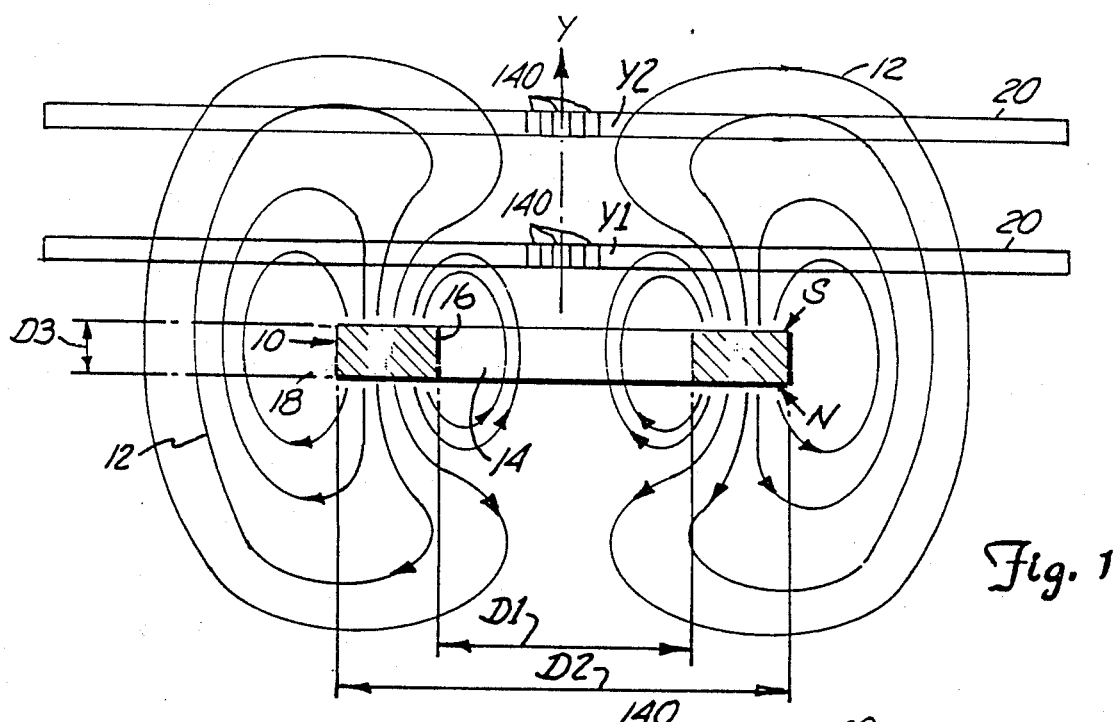
FIG. 1 is a cross-sectional representation of an annular magnet and the magnetic B field produced thereby.

The principles upon which the bias field switching system of the present invention is based can be described generally with reference to FIG. 1 in which an annular or ring-shaped permanent magnet 10 and flux lines 12 characterizing its magnetic B field are illustrated. A magneto-optic media such as disk 20 having bit positions 140 is also shown at two different positions with respect to magnet 10 in FIG. 1. Permanent magnets such as 10 are characterizied by a north pole surface N, a south pole surface S, a central gap 14, an inner edge surface 16, and an outer edge surface 18. In the embodiment shown, magnet 10 has flat pole surfaces N and S, and flat edge surfaces 16 and 18. Magnet 10 has an inner diameter of dimension D1, an outer diameter of dimension D2, and a thickness of dimension D3.

As is evident from FIG. 1, magnetic flux lines 12 emanating from pole surfaces S and N near inner edge surface 16 converge upon one another within gap 14. Magnetic flux lines emerging from pole surfaces S and N near outer edge surface 18 converge upon one another beyond the outer edge surface, rather than within gap 14. At some point between edge surfaces 16 and 18, flux lines 12 emanating from pole surfaces N and S switch from a point of convergence at locations within gap 14 to locations beyond outer edge surfaces 18.

Figure 2:
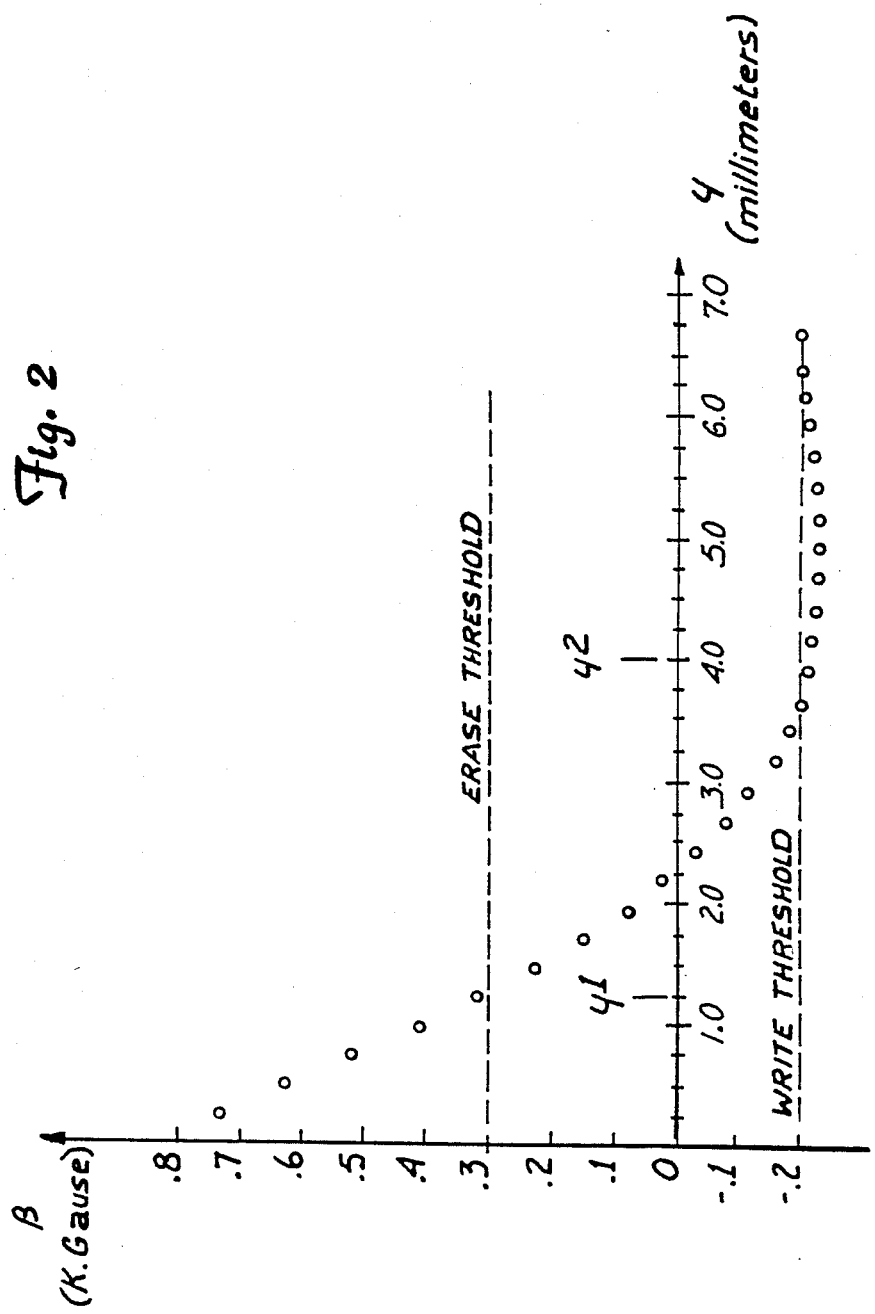
FIG. 2 is a graph representing the magnitude of the magnetic B field generated along a central axis of a magnet (such as that shown in FIG. 1) as a function of the distance from a pole surface of the magnet.

As a result of the physical configuration of permanent magnet 10 and the orientation of its flux lines 12, its magnetic B field along a Y-axis extending through a center of gap 14 perpendicular to pole surfaces S and N varies in both magnitude and polarity with increasing distance from the plane of the pole surfaces. Measured values of the magnetic B field along the Y-axis of a Crumax 322 magnet having an inner diameter D1 of 8.27 mm, an outer diameter D2 of 12.87 mm, and a thickness D3 of 0.30 mm, is shown in FIG. 2. As is evident from FIG. 2, at distances between 0.0 and 1.25 mm (i.e. y1), the magnetic B field $B(y1)$ has a positive value greater than 0.3 KGauss, the threshold required to erase data on magneto-optic disk 20 (i.e., the erase threshold). At distances between 4.0 and 5.75 mm, the field has a value less than the $-0.2$ KGauss write threshold required to write data to disk 20.

The above-described characteristics of permanent magnet 10 can be efficiently used to provide required write and erase magnetic B fields for a magneto-optic media. Referring again to FIG. 1, when disk 20 is positioned at a distance y1 from pole surface S, bit positions 140 of magneto-optic recording disk 20 along the Y-axis of the magnet will be exposed to a magnetic B field having a value greater than or equal to the required erase threshold. When disk 20 is positioned at distance y2 from pole surface S, bit positions 140 of disk 20 along the Y-axis will be exposed to a magnetic B field having a magnitude less than or equal to the required write threshold.

Figure 3:
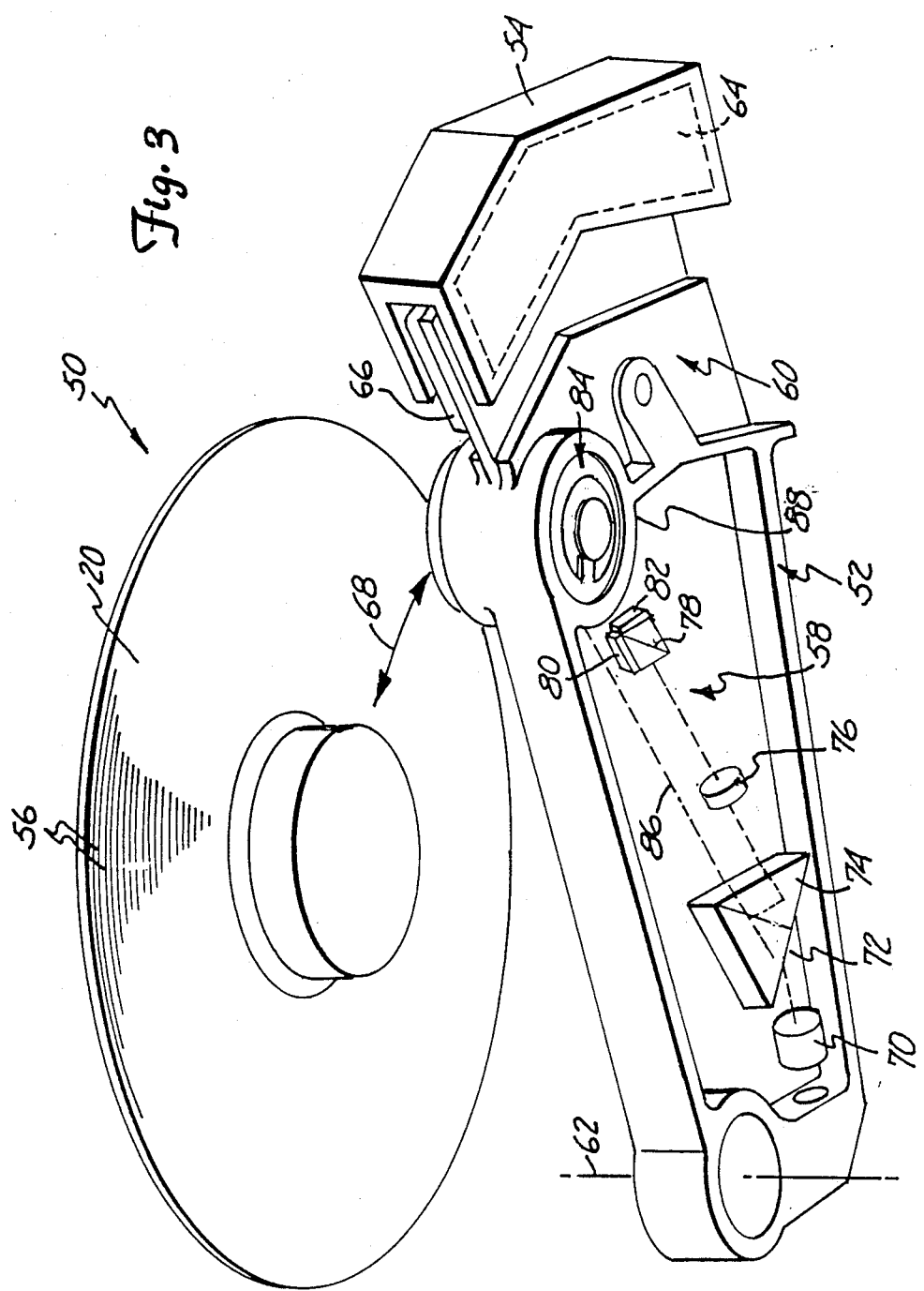
FIG. 3 is an illustration of portions of an optical disk drive which include a bias field switching mechanism in accordance with the present invention.

Portions of a magneto-optic disk drive 50 which make use of the above-described porperties of magnet 10 to write, read and erase data on magneto-optic disk 20 are illustrated generally in FIG. 3. In addition to magneto-optic disk 20, disk drive 50 includes a rotary arm 52 and tracking drive magnet assembly 54. Disk 20 has a plurality of generally concentrically positioned and radially spaced recording tracks 56, and is rotated about a central axis by a drive motor (not shown).

Rotary arm 52 is formed by an actuator arm assembly 58 and a tracking drive coil assembly 60. Tracking drive coil assembly 60 can be manufactured as an integral unit with actuator arm assembly 58, or as a separate assembly which is subsequently fastened to the actuator arm assembly. Rotary arm 52 is mounted about an axis 62 for rotational movement in a plane parallel to that of disk 20. Tracking drive magnet assembly 54 is fixedly positioned with respect to disk 20 and supports a pair of generally planar permanent magnets 64 (only one of which is illustrated in FIG. 3) on opposite sides of tracking drive coil assembly 60. Wire coils 66 are rigidly mounted to coil assembly 60 at positions between magnets 64 of assembly 54. A magnetic field generated by coils 66 in response to tracking drive signals applied thereto will interact with the magnetic field of permanent magnets 64, and drive rotary arm 52 about a radial tracking axis 68 with respect to disk 20. The magnitude and polarity of tracking drive signals applied to coils 66 can be controlled in a manner which causes optical components mounted to arm 52 and described below to track, or remain centered over, a desired servotrack 56 on or from which information is being written, read or erased.

All optical and opto-electronic components including laser diode 70, beam shaping prism 72, turn-around prism 74, columnator lens 76, polarizing beam splitter 78, detectors 80 and 82, and focus/bias field switching assembly 84 are mounted to rotary arm 52. A radiation beam 86 is generated by a laser diode 70, and an incident portion directed toward focus/bias field switching assembly 84 by prism 72. Assembly 84 focuses the incident portion of beam 86 and impinges it upon a servotrack 56 of disk 20. When writing or erasing information on servotracks 20, laser diode 70 will generate a beam 86 having a sufficiently high intensity to heat bit positions 140 to the temperature needed to switch their magnetic orientation in the presence of the write and erase bias fields.

A relatively low intensity beam is produced by laser diode 70 when information is being read from disk 20. After being modulated as a function of the magnetic orientation of bit positions 140 (FIGS. 1, 4 and 5), a reflected portion of beam 86 is directed through prism 74 and lens 76 before being impinged upon beam splitter 78. Beam splitter 78 divides the beam into two separate polarization components which are impinged upon one of detectors 80 and 82. A differential signal derived from the signals produced by detectors 80 and 82 represents the information read from disk 20 (i.e., the digital states of bit positions 140).

Focus/bias field switching assembly 84 is mounted to a cylindrical housing 88 which is preferably fabricated as an integral section of actuator arm assembly 58. Focus/bias field switching assembly 84 includes a focusing subassembly 90 and a bias field subassembly 92 which are illustrated in conjunction with a portion of optical disk 20 in FIGS. 4 and 5. Focusing subassembly 90 includes a generally planar metallic pole piece 94, objective lens support 96, objective lens 98 and prism 100. Pole piece 94 is a circular member bonded by epoxy to a first or lower edge of housing 88. Pole piece 94 has a circular central aperture 95 and a pair of elongated apertures 102 positioned on opposite sides of the central aperture. A pair of permanent magnets 104 are bonded to opposite sides of each elongated aperture 102, and are radially spaced from one another with respect to central aperture 95.

Figure 4:
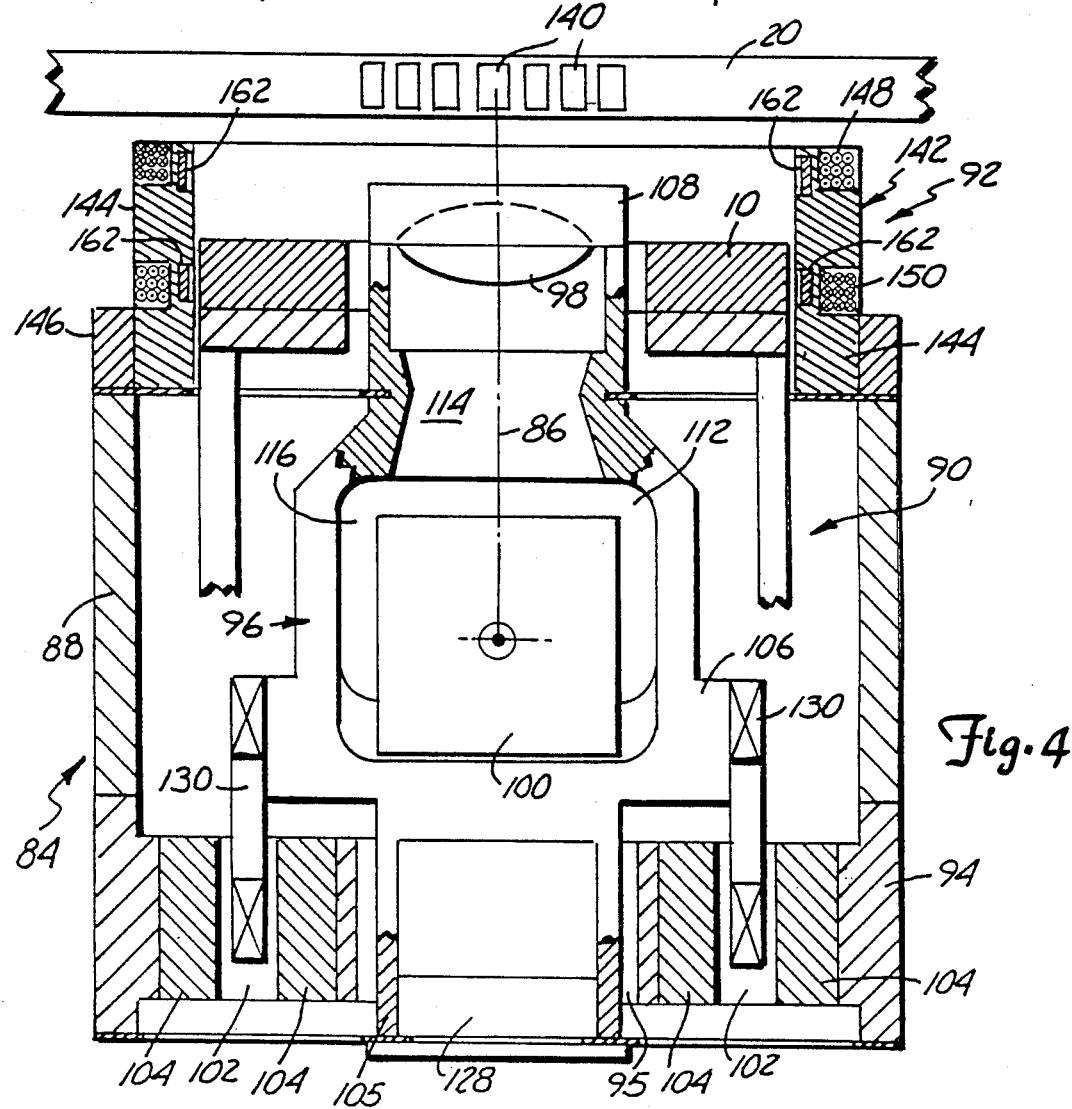
FIG. 4 is a detailed cross-sectional representation of a focus/bias field switching assembly shown in FIG. 3.
Figure 5:
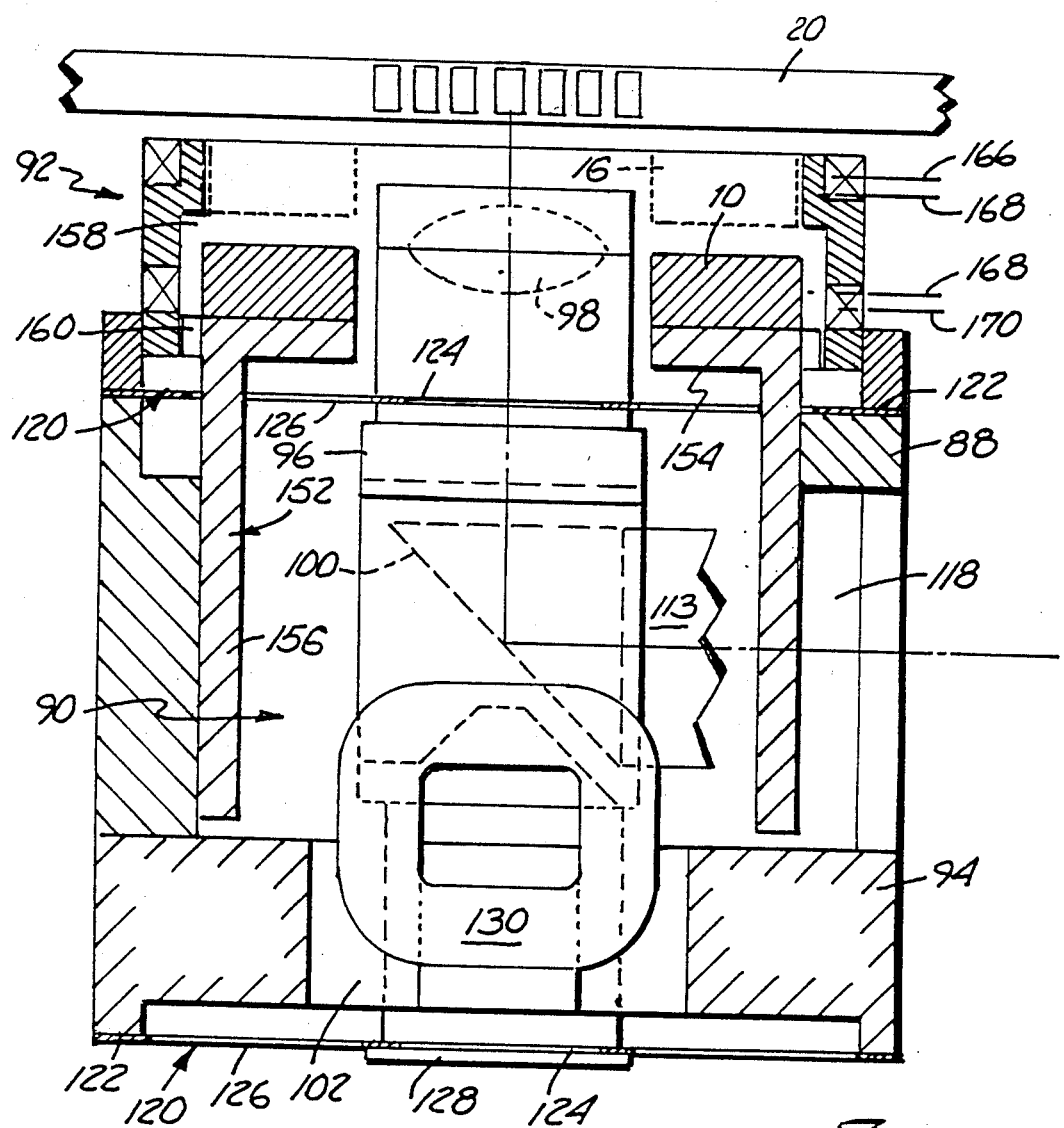
FIG. 5 is a detailed cross-sectional diagram of the focus/bias field switching assembly shown in FIG. 3 and taken from a side displaced from the side shown in FIG. 4 by ninety degrees.

Lens support 96 is preferably a one-piece plastic member which includes a lower mounting section 105, middle prism cage section 106 and upper lens mount section 108. As shown in FIGS. 4 and 5, sections 105, 106 and 108 of lens support 96 are vertically spaced about the path of beam 86. One side of prism cage section 106 has a beam opening 116 which extends into prism cavity 112. An elongated opening 114 extends through lens support 96 between lens mount section 108 and prism cavity 112, forming a path for beam 86. Objective lens 98 is mounted within lens mount section 108 of lens support 96. Prism 100 is positioned within cavity 112 and is fixedly mounted to housing 88 by means of supports such as 113 (FIG. 5). Beam opening 116 which extends into prism cage section 106 of lens support 96 is aligned with an opening 118 which extends through housing 88. Incident portions of beam 86 directed to focus/bias field switching assembly 84 pass through openings 118 and 116 before being reflected by prism 100, directed through lens 98, and impinged upon disk 20. Portions of beam 86 reflected from disk 20 traverse an identical path before they are directed back to turn-around prism 74.

A pair of leaf-type springs 120 movably support lens support 96 within housing 88, with its lower mounting section 105 extending through aperture 95 of pole piece 94. Each spring 120 has a circular outer rim 122, a circular inner rim 124, and a leaf member 126 extending between the inner and outer rims. Outer rim 122 of one of springs 120 is bonded to a lower edge of pole piece 94, while its inner rim 124 is secured to mounting section 105 of lens support 96 by fastening plug 128. The other spring 120 has its outer rim 122 bonded to an upper edge of housing 88 and its inner rim 124 secured to lens mount section 108 of lens support 96.

A pair of wire coils 130 are secured to opposite sides of lens support 96. As shown in FIGS. 4 and 5, coils 130 extend into elongated apertures 102 between magnets 104. Focus drive signals produced by a focus servo system (not shown) are applied to coils 130. Magnetic fields generated by coils 130 interact with the magnetic fields between magnets 104 Lens support 96 is then driven against a bias force of springs 120 along a focus axis generally perpendicular to disk 20. Incident portions of radiation beam 86 are thereby focused onto individual bit positions 140 by objective lens 98.

Bias field assembly 92 includes an annular permanent magnet 10 such as that described above, and an actuator mechanism 142 for driving the magnet between its write and erase positions with respect to disk 20. Actuator 142 includes a ring-shaped plastic coil form and magnet housing 144 which is mounted to an upper edge of arm housing 88 by means of mounting ring 146. Housing 144 includes two sets of coils 148 and 150 wound about recesses in its exterior surface.

Actuator assembly 142 also includes magnet sliding guide 152 which has a ring-shaped magnet receiving face 154 and a plurality of legs 156 which extend downward into housing 88 from magnet housing 144. As shown, ring magnet 10 is mounted to face 154 of guide 152. Magnet 10 and face 154 of guide 152 are concentrically positioned around lens mount section 108 of lens support 96. Magnet 10 and guide 152 are movable within magnet housing 144 between a write position illustrated in solid lines in FIG. 5, and an erase position illustrated in broken lines. When in its write position, magnet 10 will be positioned at a distance such as y2 from disk 20, and impinge a magnetic B field having a value less than or equal to the write threshold upon bit positions 140 on which objective lens 98 is focusing beam 86. When moved to its erase position, magnet 10 will be at a distance such as y1 from disk 20. A magnetic B field having a value greater than or equal to the erase threshold is then impinged upon bit positions 140, permitting data to be erased from these bit positions.

Guide 152 prevents magnet 10 from becoming cocked and wedged within magnet housing 144 while it is being driven between its write and erase positions. As shown in FIG. 5, portions of legs 156 ride along an interior surface of housing 88 while guide 152 and magnet 10 are moved together. Magnet housing 144 also includes several grooves 158 on its interior surface. Guide lugs 160 which extend radially outward from the edges of guide face 154 ride within grooves 158. Lugs 160 engage mounting ring 146 when magnet 10 is in its write position, and prevent further movement of the magnet and guide 152 from disk 20. The movement of magnet 10 in a direction toward disk 20 is limited to the erase position when lugs 160 engage the upper ends of grooves 158. Magnet 10 is held in both the write and erase positions by its magnetic attraction to ferro-magnetic members 162. Members 162 are mounted within recesses in the interior surface of magnet housing 144 adjacent magnet 10 in both its write and erase positions. The size of members 162 and the distance between them and edges 18 of magnet 10 can be adjusted to control the retaining force tending to hold magnet 10 in its write or erase positions.

As shown in FIG. 5, coils 148 and 150 are located in planes parallel to pole surfaces S and N of magnet 10. Coils 148 are positioned on magnet housing 144 in such a manner that the center 166 of the plane in which they located is positioned closer to the top edge of the magnet housing than the center 168 of width dimension D3 of magnet 10 when the magnet is in its erase position. Coils 15 are positioned on magnet housing 144 at such a location that the center 170 of the plane in which they are located is closer to the lower edge of the magnet housing than center 168 of magnet 10 when the magnet is in its write position.

Coils 148 and 150 are connected in series with one another and function in a solenoid-like manner. As indicated by the dot and arrow current flow convention used in FIGS. 4 and 5, coils 148 are wound in a direction opposite that of coils 150. In response to a bias field select pulse of a first or positive polarity applied to coils 148 and 150, the magnetic fields generated by the coils will interact with the magnetic fields of magnet 10 and force the magnet to its write position. Magnet 10 will be held in the write position by the force of attraction with ferro-magnetic members 162 adjacent coils 150. When a bias field select pulse of a second or negative polarity is applied to coils 148 and 150, the magnetic fields generated by these coils will interact with the field of magnet 10 and force the magnet to its erase position. Magnet 10 will be held in its erase position by the attractive force with ferro-magnetic members 162 adjacent coils 148. The polarity of the bias field select pulse applied to coils 148 and 150 therefore determines whether magnet 10 is located in its write or erase positions.

Bias field subassembly 92 has considerable advantages over prior art systems used to generate write and erase bias fields. The subassembly includes only a few parts, none of which need to be manufactured to high tolerances. The subassembly is therefore relatively inexpensive. It is also compact and low mass, enabling the subassembly to be carried by the rotary arm. The bias field state is easily controlled and quickly switched by a select pulse. Continuous current flow need not be applied to produce either the write or erase fields. Heat dissipation can therefore be reduced. All of these features facilitate the use of the subassembly in a half-height drive.

Although the present invention has been described with reference to preferred embodiments, workers skilled in the art will recognize that changes may be made in form and detail without departing from the spirit and scope of the invention.

What is claimed is:

1. A method for generating write and erase bias fields for use in conjunction with a magneto-optic recording medium on which data can be written and erased, including:
    providing a magnet with a side surface and producing a magnetic field which changes in polarity with increasing distance from the side surface, the magnetic field having a first polarity at a first distance from the side surface and a second opposite polarity at a second greater distance from the side surface;
    positioning the magnet with the side surface at the first distance from the magneto-optic recording medium and facing the recording medium, when erasing data; and
    positioning the magnet with the side surface at the second distance from the magneto-optic recording medium and facing the recording medium, when writing data.

2. The method of claim 1 wherein said providing a magnet includes providing a permanent magnet having an aperture extending through the magnet.

3. The method of claim 1 and further including heating the recording medium when writing or erasing data.

4. A method for writing data to and erasing data from bit positions on a magneto-optic recording medium, including:
    providing a permanent magnet having a pole surface and an imaginary axis extending from the pole surface toward the recording medium, the magnet having a first polarity erase magnetic field on the axis at a first distance from the pole surface, and a second opposite polarity write magnetic field on the axis at a second greater distance from the pole surface;
    positioning the magnet at an erase position with respect to the recording medium with the axis in alignment with the bit positions and the pole surface spaced from the recording medium by the first distance;
    heating the recording medium at the bit positions when the magnet is positioned at the erase position, to erase data from the bit positions;
    positioning the magnet at a write position with respect to the recording medium with the axis in alignment with the bit positions and the pole surface spaced from the recording medium by the second distance; and
    heating the recording medium at the bit positions when the magnet is positioned at the write position, to write data to the bit positions.

5. The method of claim 4 wherein said providing the magnet includes providing a permanent magnet having an aperture extending through the magnet.

6. The method of claim 4 wherein said heating the recording medium includes impinging a laser beam on the bit positions of the recording medium at which data is to be written to or erased from.

7. The method of claim 4 wherein said positioning the magnet at the erase and write positions includes creating magnetic fields which interact with the magnetic field of the permanent magnet, forcing the permanent magnet to its write and erase positions.

8. The method of claim 7 wherein said positioning the magnet includes releasably latching the magnet at the erase and write positions.

9. Apparatus for writing data to and erasing data from bit positions on a magneto-optic recording medium, including:
    permanent magnet means having a pole surface and an imaginary axis extending from the pole surface toward the recording medium, the magnet means having a first polarity erase magnetic field on the axis at a first distance from the surface, and a second opposite polarity write magnetic field on the axis at a second greater distance from the surface.
    a positioning mechanism for positioning the magnet means with respect to said bit positions on the recording medium, the positioning mechanism positioning the pole surface of the magnet at the first distance from the recording medium with the axis in alignment with said bit positions from which data is to be erased, and positioning the pole surface of the magnet at the second distance from the recording medium with the axis in alignment with bit positions to which data is to be written; and
    a heating mechanism for heating said bit positions on the recording medium at which data is to be written to and erased from.

10. The apparatus of claim 9 wherein the heating mechanism includes a laser.

11. The apparatus of claim 9 wherein the permanent magnet means includes a permanent magnet having an aperture extending through the magnet.

12. The apparatus of claim 11 wherein the positioning mechanism includes a solenoid for generating magnetic fields which interact with the magnetic field of the permanent magnet, forcing the permanent magnet to its write and erase positions.

13. The apparatus of claim 12 and further including latching mechanism for releasably latching the permanent magnet in said write and erase positions.

14. The apparatus of claim 13 wherein the latching mechanism includes ferro-magnetic elements adjacent the erase and write positions of the permanent magnet.

15. The apparatus of claim 12 wherein the solenoid includes:
   a guide for guiding the permanent magnet between said write and erase positions; and
   a coil assembly adjacent the guide.

16. The apparatus of claim 15 wherein the coil assembly includes:
   a first coil wound about the guide adjacent the write position; and
   a second coil wound about the guide adjacent the erase position.

17. The apparatus of claim 16 wherein: the permanent magnet has an edge with a center;
   the first coil is positioned in a plane opposite the center of the edge of the magnet from the second coil when the magnet is in its erase position; and
   the second coil is positioned in a plane opposite the center of the edge of the magnet from the first coil when the magnet is in its write position.

18. The apparatus of claim 17 wherein the first and second coils are connected in series and wound in opposite directions.

19. The apparatus of claim 17 and further including ferro-magnetic elements mounted to the guide adjacent the write and erase positions of the magnet.

20. The apparatus of claim 11 and further including an objective lens having an optical axis extending through the aperture of the magnet.

21. A magneto-optic disk drive including:
   a magneto-optic disk;
   an arm mounted for movement in a plane adjacent and parallel to the disk;
   a magnet guide mounted to the arm;
   a ring-shaped permanent magnet having pole surfaces and a central aperture, the magnet positioned in the magnet guide for linear movement generally perpendicular to the disk between an erase position at which an erase polarity magnetic field is impinged upon the disk and a write position at which a write polarity magnetic field is impinged upon the disk;
   an actuator mounted with respect to the magnet guide for driving the magnet between its write and erase positions.

22. The magneto-optic disk drive of claim 21 and further including a latching mechanism for releasably latching the magnet in said write and erase positions.

23. The magneto-optic disk drive of claim 21 wherein the actuator includes a coil assembly for creating magnetic fields which interact with the magnetic fields of the permanent magnet, forcing the magnet between said write and erase positions.

24. The magneto-optic disk drive of claim 23 wherein the coil assembly includes:
   a guide for guiding the magnet between said write and erase positions;
   a first coil wound about the guide adjacent the write position of the magnet; and
   a second coil wound about the guide adjacent the erase position of the magnet.

25. The magneto-optic disk drive of claim 24 wherein:
   the permanent magnet has an edge with a center;
   the first coil is positioned in a plane opposite the center of the edge of the magnet from the second coil when the magnet is in said erase position; and
   the second coil is positioned in a plane opposite the center of the edge of the magnet from the first coil when the magnet is in said write position.

26. The magneto-optic disk drive of claim 25 wherein the first and second coils are connected in series and wound in opposite directions.

27. The magneto-optic disk drive of claim 21 and further including an objective lens mounted to the arm and having an optical axis extending through the aperture of the magnet.

28. The magneto-optic disk drive of claim 21 and further including ferro-magnetic elements mounted to the guide means adjacent the erase and write positions of the magnet.

29. Apparatus for impinging write and erase bias fields on bit positions of a magneto-optic recording medium, including:
   a permanent magnet having first and second pole surfaces and an aperture extending through the magnet between the pole surfaces about an imaginary axis, the magnet having a first polarity erase magnetic field on the axis at a first distance from the first pole surface, and a second and opposite polarity write magnetic field on the axis at a second greater distance from the first pole surface;
   a support for supporting the magnet for linear movement between erase and write positions at which the first pole surface faces the recording medium and the imaginary axis is in alignment with the bit positions, the first pole surface being spaced from the recording medium by the first distance when the magnet is in the erase position, and spaced from the recording medium by the second distance when the magnet is in the write position; and
   an actuator for driving the magnet between its write and erase positions.

30. The apparatus of claim 29 and further including a laser for heating said bit positions on the recording medium at which data is to be written to or erased from.

31. The apparatus of claim 30 and further including a latching mechanism for releasably latching the magnet in said write and erase positions.

32. The apparatus of claim 31 and further including an objective lens having an optical axis extending through the aperture of the magnet.

* * * * *